United States Patent
Kohlenberg

(10) Patent No.: US 11,820,021 B2
(45) Date of Patent: Nov. 21, 2023

(54) AUTOMATED CASE HANDLING SYSTEM

(71) Applicant: Motion Controls Robotics, Inc., Fremont, OH (US)

(72) Inventor: Nathan Steven Kohlenberg, Green Springs, OH (US)

(73) Assignee: Motion Controls Robotics, Inc., Fremont, OH (US)

( * ) Notice: Subject to any disclaimer, the term of this patent is extended or adjusted under 35 U.S.C. 154(b) by 243 days.

(21) Appl. No.: 17/214,233

(22) Filed: Mar. 26, 2021

(65) Prior Publication Data

US 2021/0299874 A1    Sep. 30, 2021

Related U.S. Application Data

(60) Provisional application No. 63/000,486, filed on Mar. 26, 2020.

(51) Int. Cl.
*B25J 9/16* (2006.01)
*B25J 9/00* (2006.01)
*B25J 13/08* (2006.01)

(52) U.S. Cl.
CPC .......... *B25J 9/1679* (2013.01); *B25J 9/0009* (2013.01); *B25J 9/0093* (2013.01); *B25J 13/088* (2013.01)

(58) Field of Classification Search
CPC ...... B25J 9/1679; B25J 9/0009; B25J 9/0093; B25J 13/088; B25J 11/00; B07C 5/342; B65B 51/067; B65B 61/26; B65B 57/04; B65B 61/28; B65B 59/003; G05B 2219/39102; G05B 19/4182
See application file for complete search history.

(56) References Cited

U.S. PATENT DOCUMENTS

| | | | |
|---|---|---|---|
| 5,501,571 A * | 3/1996 | Van Durrett ........... | B65G 61/00 414/21 |
| 9,969,519 B2 * | 5/2018 | Putzer ...................... | B65C 9/40 |
| 10,835,928 B2 * | 11/2020 | Bellar ....................... | B07C 3/08 |
| 2003/0023337 A1 * | 1/2003 | Godfrey .................. | A61P 11/08 700/109 |
| 2009/0028686 A1 * | 1/2009 | Tallis ..................... | B65G 61/00 414/793.4 |

(Continued)

*Primary Examiner* — Kira Nguyen
(74) *Attorney, Agent, or Firm* — William H. Honaker; Dickinson Wright PLLC

(57) ABSTRACT

The present invention provides an automated case handling system and method. The automated case handling system can determine the existence of a proper seal on a case, the location of a label or other criteria or place a label or other information on a case. It can be a self-contained unit that can be easily inserted into an existing case handling line. To facilitate easy installation, the disclosed embodiment is powered by electricity and can be configured to plug into a single power source. The automated case handling system has a control unit for controlling the operation. A first sensor determines the dimensions of a case. A second sensor is mounted on the moveable sensor support. The second sensor senses predetermined criteria on a case as the second sensor is moved along a case. The second sensor provides a detection signal to the control unit as to the existence of the predetermined criteria on a case. The detection signal gives a go authorization to the control unit to release a case or a no-go to redirect the case along a secondary travel path.

22 Claims, 1 Drawing Sheet

(56) References Cited

U.S. PATENT DOCUMENTS

2016/0016737 A1* 1/2016 Tisserand .............. B65G 45/08
  184/15.2
2018/0224837 A1* 8/2018 Enssle ................ G06Q 10/0875
2022/0358341 A1* 11/2022 Takahashi .......... G06K 7/10425

* cited by examiner

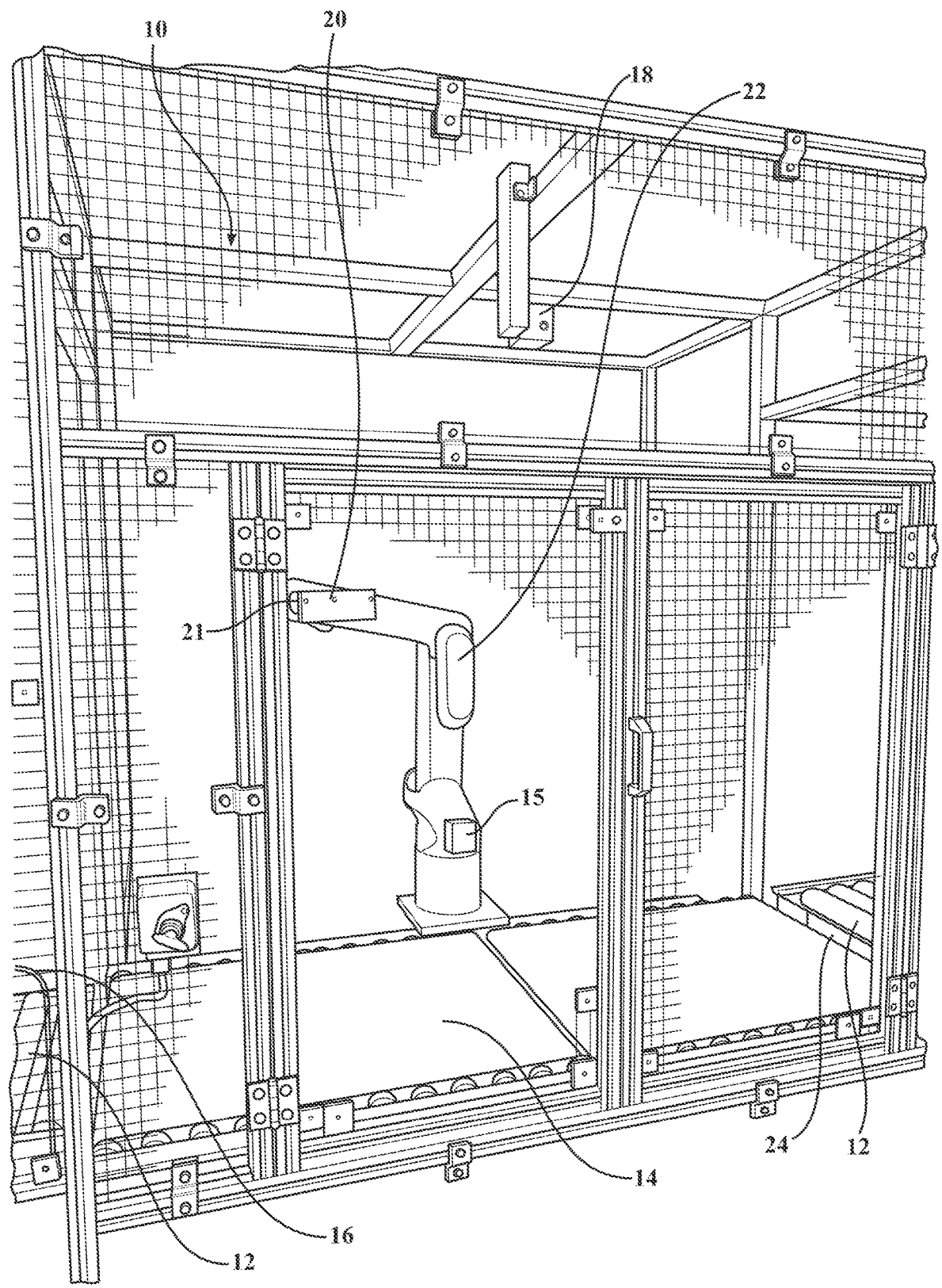

AUTOMATED CASE HANDLING SYSTEM

RELATED APPLICATIONS

This application claims the benefit of U.S. Provisional Application Ser. No. 63/000,486, filed Mar. 26, 2020, which is incorporated herein by reference in its entirety.

TECHNICAL FIELD

The present invention generally relates to automated packing systems and more specifically to automated packing systems for handling cases of random sizes.

BACKGROUND OF THE INVENTION

An automated packing or packaging system, such as for example, a robotic picking and packing application, is defined as the picking of products and packing them into a case or tray. In most pick and pack operations, product is delivered from a primary packaging operation on a continuously moving conveyor and randomly ordered. In some instances, the product may be pre-grouped, ready for multiple product picking/packing, and/or may be in segmented or riding on a lugged conveyor so the product is in repeatable, uniformly spaced locations.

Robotic picking and packing solutions for packaging are consistent, flexible, precise and fast. In today's manufacturing environment, it is common to have multiple product changes on a daily basis. Pick and pack applications can easily accommodate this by providing interchangeable tooling and multiple product recipes selected through a user-interface on for example a PC.

When packing a case, the automated system will erect the case and seal one end, by for example packing tape. The erected case will then be conveyed for packing. Product is selected and packed into the case. The top of the packed case is then sealed, again for example with packing tape. The packed case can then be conveyed to a station for shipping or palletizing. Along this processing path, the case can also have labels or other indicia applied as desired.

A problem with automated packing systems occurs when a case is not properly sealed. Another problem occurs when labels are misapplied or not applied. If the case is not properly sealed, when it is picked up for shipping or palletizing, the contents can spill out. When this occurs, a system shutdown is typically required to clean up the spilled material. Missed labels or the misapplication of labels can also create problems in shipping, product placement and identification.

What is needed is a system for checking that the case has been properly sealed and labels applied. What is needed even more is a system that can handle randomly sized cases.

SUMMARY OF THE INVENTION

The present invention provides an automated case handling system and method that can handle randomly sized cases. The automated case handling system of the present invention can function to determine that the case is properly sealed, the location of a label or other criteria or to place a label or other information on a case.

The automated case handling system of the present invention is disclosed as a self-contained unit that can be easily inserted into an existing case handling line. To facilitate easy installation, the disclosed system is powered by electricity and can be configured to plug into a single power source.

The automated case handling system has a control unit for controlling its operation. This control unit is a programmable CPU. A system travel path is provided. In the disclosed embodiment, the system travel path is a self-contained conveyor that can be inserted into an existing conveyor line. The travel system path can also be any number of alternatives for transporting packages, including robots, gantries etc.

A first sensor is mounted adjacent the system travel path. The first sensor determines the dimensions of a case located on the system travel path. In most instances, the first sensor determines the height and length of the case, but could determine width as well and also the shape of the case, for example, square, rectangular, tubular, pyramidal, etc.

A moveable sensor support is mounted adjacent the system travel path. The moveable sensor support can move along a case located on the system travel path. The first sensor communicates with the control unit to control the movement of the moveable sensor support to guide the moveable sensor support about a case. Regardless of the size of the case, the robot receives instructions to move close to the case without touching the case.

A second sensor is mounted on the moveable sensor support. The second sensor senses predetermined criteria on a case as the second sensor is moved along a case. The second sensor provides a detection signal to the control unit as to the existence of the predetermined criteria on a case. The detection signal gives a go authorization to the control unit to release a case or a no-go to redirect the case along a secondary travel path.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 1 is a perspective view of the automated case inspection system of the present invention

DESCRIPTION OF THE ENABLING EMBODIMENT

The automated package or case handling system of the present invention is shown generally at 10 in FIG. 1. The system 10 is mounted along a travel path which is illustrated as a continuous conveyor 12. It should be understood that that the travel path could take different forms other than a conveyor. For example, the path could be a robot moving the cases to the system 10, or a ramp upon which the cases slide to the system 12, etc. The handling system 10 has a system travel path 14 which can be inserted into the main continuous conveyor system 12. The travel path is shown as a conveyor, but again, it could be a robot holding the case or a flat surface upon which the case rests. The system also includes a secondary path 16 upon which cases that are not acceptable are conveyed.

The system 10 of the present invention rapidly handles cases of random size. For example, the system 10 can check whether the case has been properly sealed on the top and bottom, can apply labels to the case or verify that labels have been properly placed on the case. In the disclosed embodiment, the system 10 is a self-contained modular unit that can be inserted into an existing automated line. To facilitate easy assembly and installation, the unit 10 is electric. Once positioned in an automated line, the unit 10 can be plugged into an electrical source and is fully operational. It should be appreciated that the system 10 doesn't have to be modular. It can be assembled separately if desired.

A first sensor 18 is positioned over the system travel path 14. In the disclosed embodiment, sensor 18 is a time of flight sensor. By way of example, an ifm 3D time of flight sensor can be used. The time of flight sensor measures the distance between the sensor and an object based on the time difference between the emission of a signal and its return to the sensor after being reflected by the object. The first sensor 18 determines the desired outer dimensions and even the shape of the case. These can be all dimensions or select dimensions such as height and length. As the cases enter the unit 10, the sensor rapidly determines the dimensions and if desired the shape of the case. In this way, cases of various sizes and even shapes can be scanned and the information can be sent to a control unit 15 for controlling the movement of the sensor or scanner support 20. This scanning can be accomplished very rapidly. For example, a case can be scanned in 0.8 seconds.

The information from the first sensor 18 is communicated to the control unit 15 to control the movement of the scanner support 20. In the disclosed embodiment, the scanner support 20 has a robotic arm 22 with a second sensor or scanner 21 mounted upon the robotic arm 22. In this way, the second sensor 21 can be moved along the predetermined path based upon the communication from the first sensor 18 to determine whether sealing tape or labels have been properly attached to the case. In the disclosed embodiment, the second sensor 21 is a reflective sensor such as for example Sick Glare Sensor, 50 mm (Item #1068822), which emits a light on the package and that light is reflected if the sealing tape or label is properly positioned. A Cognex barcode reader could also be used to verify that the label is properly positioned and has the correct data. A label applicator can also be used to apply labels.

The control for the robotic arm 22 receives the information developed by the first sensor 18 and based upon this information determines the path for the robotic arm 22. For example, a 24-inch-high and 40-inch-long case could be positioned on the system travel conveyor or travel path 14 adjacent the robotic arm 22. The first sensor 18 communicates the case size to the control unit 15 which then controls the robotic arm 22 with the second sensor 21 attached. The robotic arm 22 and sensor 21 move along the sides and top to determine the proper placement of for example sealing tape. When this is completed, the case moves along the travel path 14 and another case can enter and the process is repeated. The system can handle about 10 boxes per minute, but with box size and design changes greater numbers could be handled.

In the event the sealing tape is properly positioned, the control unit 15 generates a go signal allowing the system conveyor 14 to move the case to the main conveyor or travel path 12. In the event the second sensor 21 does not sense the presence of sealing tape, a no-go signal is provided and the package is transferred down the secondary conveyor or travel path 16. This product can then be resent to the sealing equipment or conveyed to a holding area for later operations.

It should be appreciated that the sensor 21 could also be programmed to detect the existence of a label or include a label application attachment to apply a label.

In order to ensure that only one case at a time is presented to the automated package handling system 10 of the present invention, and that the case is properly aligned, an intermittent stop 24 is provided between the beginning of the system conveyor and the main conveyor 12. This intermittent stop as disclosed is a pop-up stop 24 which pops up after a case begins its travel onto the travel path 14. In this way a second case can't enter the sensing area defined by the system conveyer 14. The stop 24 also aligns the next approaching case as that case abuts the stop 24.

In the preferred embodiment, the present invention is an electric system to allow easy installation in an existing continuous conveyor operation. The system can be completely self-contained and merely requires placement within a conveyor or travel path and then electric power to operate the system.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An automated case handling system comprising:
a system travel path;
a control unit for controlling said automated case handling system;
a first sensor mounted adjacent said system travel path, said first sensor determining dimensions of a case located on said system travel path;
a moveable sensor support, configured to move along a case located on said system travel path;
said first sensor communicating with said control unit to control the movement of said moveable sensor support to guide said moveable sensor support about a case;
a second sensor mounted upon said moveable sensor support, said second sensor sensing predetermined criteria on a case as said second sensor is moved along a case, said second sensor providing a detection signal to said control unit as to the existence of said predetermined criteria on a case; said detection signal giving a go authorization to said control unit to release a case or a no-go to redirect the case along a secondary travel path.

2. The automated case handling system of claim 1, further including a main transport path, said main transport path being adapted to transport a plurality of cases along said main transport path to said system transport path and to receive cases for further transport from said system transport path.

3. The automated case handling system of claim 2, further including an intermittent stop positioned between said main transport path and said system transport path, said intermittent stop activates to maintain separation of cases on said main transport path and to align subsequent cases;
whereby only a consecutive single case can enter said system transport path.

4. The automated case handling system of claim 1, wherein said system transport path, main transport path and secondary transport path are all conveyors.

5. The automated case handling system of claim 1, wherein said moveable sensor support is a robot.

6. The automated case handling system of claim 1, wherein said moveable sensor support is a gantry.

7. The automated case handling system of claim 1, wherein said first and second sensors, said system travel path, said moveable sensor support and said control unit are electrically powered.

8. An automated case labeling system comprising:
a system travel path;
a control unit for controlling said automated case labeling system;
a first sensor mounted adjacent said system travel path, said first sensor determining dimensions of a case located on said system travel path;
a moveable support, configured to move along a case located on said system travel path;
said first sensor communicating with said control unit to control the movement of said moveable support to guide said moveable support about a case;
a label attachment unit mounted to said moveable support, said label attachment unit applying a label to a case at a predetermined desired location.

9. The automated case labeling system of claim 8, further including a second sensor mounted upon said moveable support, said second sensor sensing predetermined criteria on a case as said second sensor is moved along a case, said second sensor providing a detection signal to said control unit as to the existence of said predetermined criteria on a case; said detection signal giving a go authorization to said control unit to release a case or a no-go to redirect the case along a secondary travel path.

10. The automated case handling system of claim 9, wherein said system transport path, main transport path and secondary transport path are all conveyors.

11. The automated case handling system of claim 8, further including a main transport path, said main transport path being adapted to transport a plurality of cases along said main transport path to said system transport path and to receive cases for further transport from said system transport path.

12. The automated case handling system of claim 11, further including an intermittent stop positioned between said main transport path and said system transport path, said intermittent stop activates to maintain separation of cases on said main transport path and to align each case;
whereby only a single case can enter said system transport path at a time and the case is aligned when entering.

13. The automated case handling system of claim 8, wherein said moveable support is a robot.

14. The automated case handling system of claim 8, wherein said moveable support is a gantry.

15. The automated case handling system of claim 8, wherein said first and second sensors, said system travel path, said moveable support and said control unit are electrically powered.

16. A method for autonomously handling cases comprising:
providing an automated case handling system including a system travel path;
a control unit; a first sensor mounted adjacent said system travel path; a moveable support for moving along a case located on said system travel path; and a second sensor mounted upon said moveable sensor support;
defining criteria located upon a case to be sensed;
sensing with said first sensor dimensions of a case located on said system travel path;
communicating said dimensions to said control unit;
said control unit interpreting said dimensions, said control unit thereafter controlling movement of said moveable support based upon said dimensions and guiding said moveable support about a case;
sensing with said second sensor said predetermined criteria on a case as said second sensor is moved along a case,
said second sensor providing a detection signal to said control unit as to the existence of said predetermined criteria on a case; said detection signal giving a go authorization to said control unit to release a case or a no-go detection signal to redirect a case.

17. The method for autonomously handling cases of claim 16, further including a main transport path and a secondary path;
mounting said system transport path adjacent said main transport path and said secondary path;
transporting a plurality of cases of random sizes along said main transport path to said system transport path;
handling said cases at said system transport path;
said second sensor communicating with said control unit, said control unit releasing a case onto said main path after receiving a go authorization or redirecting a case to said secondary path after receiving a no-go detection signal.

18. The method for autonomously handling cases of claim 17, further including an intermittent stop positioned between said main transport path and said system transport path; activating said intermittent stop as a case approaches said system transport path, maintaining separation of cases on said main transport path;
allowing only a single case to enter said system transport path at a time.

19. The method for autonomously handling cases of claim 16, wherein said system transport path, main transport path and secondary transport path are all conveyors.

20. The method for autonomously handling cases of claim 16, wherein said moveable support is a robot.

21. The method for autonomously handling cases of claim 16, wherein said moveable support is a gantry.

22. The method for autonomously handling cases of claim 16, providing electric power;
powering said first and second sensors, said system travel path, moveable support and said control unit by electrical power.

* * * * *